(12) United States Patent
Keown

(10) Patent No.: US 6,842,117 B2
(45) Date of Patent: Jan. 11, 2005

(54) SYSTEM AND METHOD FOR MONITORING AND INDICATING A CONDITION OF A FILTER ELEMENT IN A FLUID DELIVERY SYSTEM

(75) Inventor: Dan Lee Keown, Bedford, TX (US)

(73) Assignee: Filter Sense of Texas, Ltd., Arlington, TX (US)

( * ) Notice: Subject to any disclaimer, the term of this patent is extended or adjusted under 35 U.S.C. 154(b) by 67 days.

(21) Appl. No.: 10/440,982

(22) Filed: May 19, 2003

(65) Prior Publication Data

US 2004/0113803 A1 Jun. 17, 2004

Related U.S. Application Data

(60) Provisional application No. 60/432,722, filed on Dec. 12, 2002.

(51) Int. Cl.[7] ............................................. G08B 21/00
(52) U.S. Cl. ..................... 340/607; 340/606; 340/608; 340/648
(58) Field of Search ................................ 340/605, 606, 340/607, 608, 610, 616, 618, 648; 95/25; 204/664; 307/11, 147; 184/6.3; 417/18

(56) References Cited

U.S. PATENT DOCUMENTS

| | | | |
|---|---|---|---|
| 5,281,100 A | * 1/1994 | Diederich | 417/18 |
| 5,337,576 A | 8/1994 | Dorfman et al. | 340/607 |
| 5,351,035 A | 9/1994 | Chrisco | 340/607 |
| 5,461,368 A | 10/1995 | Comer | 340/607 |
| 5,668,535 A | 9/1997 | Hendrix et al. | 340/607 |
| 5,782,315 A | * 7/1998 | Reinosa | 184/6.3 |
| 5,810,908 A | 9/1998 | Gray et al. | 340/607 |
| 5,850,183 A | 12/1998 | Berry, III | 340/607 |
| 5,958,205 A | * 9/1999 | Ingalls et al. | 204/664 |
| 6,107,923 A | 8/2000 | Christol | 340/607 |
| 6,125,481 A | * 10/2000 | Sicilano | 4/509 |
| 6,407,469 B1 | * 6/2002 | Cline et al. | 307/11 |

* cited by examiner

Primary Examiner—Van T. Trieu
(74) Attorney, Agent, or Firm—Eric Karich (57) ABSTRACT

A filter condition sensing circuit includes current and voltage sensors and a data processor. The current and voltage sensors produce signals indicating magnitudes of electrical current and voltage, respectively, provided to an electric motor used to move a fluid (a gas or liquid) through a filter element. During a first time period, the data processor uses the signals to determine an acceptable range of electrical power required by the motor. During a second time period, the data processor uses the signals to determine a magnitude of electrical power required by the motor. When the magnitude of electrical power is within the acceptable range of electrical power, the data processor generates a signal indicating a normal condition of the filter element. A described filter condition indicating system includes the circuit. A method is for determining a condition of a filter element.

20 Claims, 8 Drawing Sheets

SYSTEM AND METHOD FOR MONITORING AND INDICATING A CONDITION OF A FILTER ELEMENT IN A FLUID DELIVERY SYSTEM

CROSS-REFERENCE TO RELATED APPLICATIONS

This application for a utility patent claims the benefit of U.S. Provisional Application No. 60/432,722 filed Dec. 12, 2002.

The above related application is incorporated herein by reference in its entirety.

BACKGROUND OF THE INVENTION

1. Field of the Invention

This invention relates generally to fluid delivery systems, and more particularly to systems and methods for monitoring conditions of filter elements in fluid delivery systems.

2. Description of Related Art

Many fluid delivery systems (e.g., systems for moving gases such as air and liquids such as water) include filter elements (i.e., filters) at or near fluid inlets for removing particulates from the fluid. Removing such particulates not only improves fluid quality, it also prevents the particulates from building up on system components in contact with the fluid. Such buildup reduces system performance and is generally difficult to remove. For example, a typical heating, ventilating, and air conditioning (HVAC) system includes a filter at or near an air inlet for removing particulates from the air such as dust, pollen, etc. Removing such particulates not only improves air quality, it also prevents the particulates from building up on system components in contact with the air. Such buildup reduces the ability of the HVAC system to circulate air, and is generally difficult to remove.

As a filter removes particulates from a fluid over time, the filter eventually becomes clogged with the particulates (i.e., becomes "dirty"), and fluid flow through the filter is reduced. If the filter is allowed to become completely clogged, fluid flow stops. It is generally well known that filters must be either cleaned or replaced when fluid flow is sufficiently reduced by a buildup of particulates.

As it is generally difficult to determine the condition of a filter, most filter replacements are performed on a time basis (HVAC filters), a distance basis (automobile oil filters), or a total-operating-hours basis. Such filter replacement schedules tend to be conservative. It is also true that many fluid delivery system users tend to be lax about filter replacements, often resulting in reduced system performances.

There is thus a need for a system and method for determining the condition of a filter. The present invention fulfills this needs and provides further related advantages as described in the following summary.

SUMMARY OF THE INVENTION

A filter condition sensing circuit is disclosed including a current sensor, a voltage sensor, and a data processor. The current sensor is coupled to a conductor providing electrical current to a motor used to move a fluid (i.e., a gas or a liquid) through a filter element, and produces a signal indicating a magnitude of the electrical current. The voltage sensor is coupled to a pair of conductors providing electrical voltage to the motor, and produces a signal indicating a magnitude of the electrical voltage. The data processor receives the signals produced by the current sensor and the voltage sensor. During a first time period, the data processor uses the signals to determine an acceptable range of electrical power required by the electric motor. During a second time period subsequent to the first, the data processor uses the signals to determine a magnitude of electrical power required by the electric motor. When the magnitude of electrical power required by the electric motor during the second time period is within the acceptable range of electrical power, the data processor generates an output signal indicating a normal condition of the filter element.

A filter condition indicating system is described including the filter condition sensing circuit and a filter status indicator. The filter status indicator receives the output signal and indicates the normal condition of the filter element to a user in response to the output signal.

A method is disclosed for determining a condition of a filter element. During a first time period, an acceptable range of electrical power required by an electric motor used to move a fluid through the filter element is determined. A magnitude of electrical power required by the electric motor during a second time period subsequent to the first time period is also determined. In the event the magnitude of electrical power required by the electric motor during the second time period is within the acceptable range of electrical power, a signal is generated that indicates a normal condition of the filter element.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
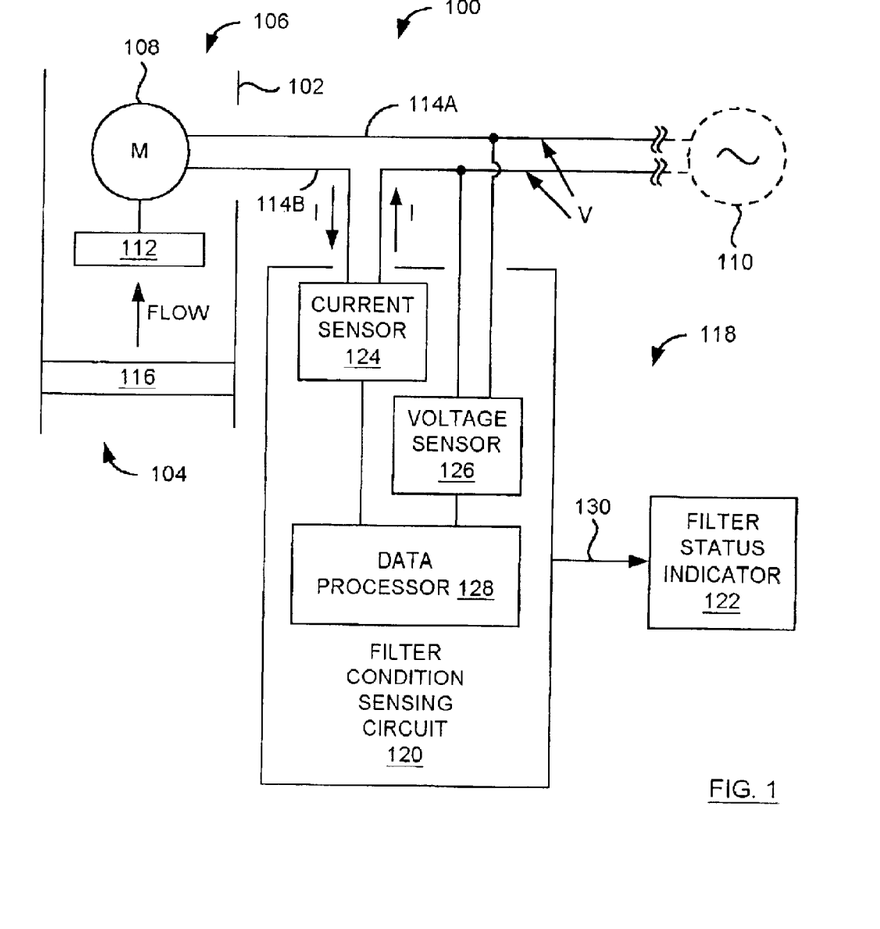
FIG. 1 is a diagram of a fluid delivery system including an electric motor for producing motion in the fluid, a filter element (i.e., filter) in a path of fluid flow, and a filter conditioning indicating system, wherein the filter condition indicating system includes a filter condition sensing circuit.

FIG. 1 is a diagram of a fluid delivery system 100 for delivering a fluid. The fluid may be, for example, a gas such as air or a liquid such as water. The fluid delivery system 100 includes a housing 102 having a fluid inlet 104 and a fluid outlet 106. Within the fluid delivery system 100, the fluid flows from the fluid inlet 104 to the fluid outlet 106 as indicated in FIG. 1.

The fluid delivery system 100 also includes a fluid flow producing device 112 for producing a flow in the fluid from the fluid inlet 104 to the fluid outlet 106. As indicated in FIG. 1, the fluid flow producing device 112 is connected to an electric motor 108. The motor 108 is connected to an alternating current (a.c.) power source 110 via a pair of conductors 114A and 114B. It is noted that a connection device (e.g., a switch or relay) would also expectedly exist between the motor 108 and the a.c. power source 110.

In general, the motor 108 converts electrical energy from the a.c. power source 110 to mechanical energy. The fluid flow producing device 112 is actuated (i.e., driven) by the motor 108, and the fluid flow producing device 112 operates when the motor 108 operates.

As is typical, the motor 108 has a shaft that rotates when the motor 108 is operating. The fluid flow producing device 112 is connected to the shaft, and is operated by the rotating shaft. For example, the fluid flow producing device 112 may rotate when operating, and may be connected to the shaft of the motor 108 either directly or via a belt, chain, or gear drive mechanism. The fluid flow producing device 112 may be, for example, a fan blade or propeller for producing gas flow, or an impeller for producing liquid flow.

The fluid delivery system 100 also includes a filter element 116 positioned between the fluid inlet 104 and the fluid outlet 106 for removing particulates from the fluid. The fluid flows through the filter element 116 as indicated in FIG. 1, and the filter element 116 filters particulates from the fluid as the fluid flows through the filter element 116. The filter element 116 is preferably located between the fluid inlet 104 and the fluid flow producing device 112 as shown in FIG. 1 such that particulates are removed from the fluid by the filter element 116 before the fluid reaches the flow producing device 112. The filter element 116 is preferably removable for cleaning and/or replacement.

In one embodiment, the fluid delivery system 100 is part of a heating, ventilation, and air conditioning (HVAC) system. The fluid flow producing device 112 and the motor 108 form a fan for moving air through the HVAC system. The filter element 116 filters airborne particulates such as dust and pollen from the air as the air moves through the filter element 116.

In another embodiment, the fluid delivery system 100 is part of a liquid pumping system. The fluid flow producing device 112 and the motor 108 form a pump for moving the liquid through the liquid pumping system. The filter element 116 filters particulates suspended in the liquid from the liquid as liquid flows through the filter element 116.

The fluid delivery system 100 also includes a filter condition indicating system 118 including a filter condition sensing circuit 120 coupled to a filter status indicator 122. In general, the a filter condition sensing circuit 120 determines a condition of the filter element 116 and sends a signal 130 to the filter status indicator 122 indicative of the condition of the filter element 116.

In general, the filter status indicator 122 indicates the condition of the filter element 116 (e.g., to a user). The filter status indicator 122 may include, for example, a green indicator lamp or light-emitting diode and a red indicator lamp or light-emitting diode. When the condition of the filter element 116 is normal (i.e., not overly restrictive), the green indicator lamp or light-emitting diode may be illuminated, and the red indicator lamp or light-emitting diode may not be illuminated. On the other hand, when the condition of the filter element 116 is abnormal (i.e., overly restrictive), the red indicator lamp or light-emitting diode may be illuminated, and the green indicator lamp or light-emitting diode may not be illuminated.

As indicated in FIG. 1, the filter condition sensing circuit 120 includes a current sensor 124, a voltage sensor 126, and a data processor 128. In the embodiment of FIG. 1, the current sensor 124 is coupled into to the conductor 114B such that the current sensor 124 is located in an electrical current path of the motor 108. The current sensor 124 senses (i.e., measures) a magnitude of electrical current provided to the motor 108, and produces a signal indicative of the magnitude of electrical current provided to the motor 108. The current sensor 124 provides the signal to the data processor 128.

The a.c. electrical current I provided to the motor 108 is expectedly sinusoidal, and given by:

$$I = I_{MAX} \cdot \sin(2\pi f t)$$

where $I_{MAX}$ is a maximum amplitude of the a.c. current, f is the frequency of the a.c. current (e.g., 60 Hz), and t=time. In contemplated embodiments, the signal produced by the current sensor 124 is indicative of the maximum amplitude of the a.c. current $I_{MAX}$ provided to the motor 108.

The voltage sensor 126 is connected to each of the conductors 114A and 114B providing electrical power to the motor 108. The voltage sensor 126 senses (i.e., measures) a magnitude of electrical voltage provided to the motor 108 via the pair of conductors 114A and 114B, and produces a signal indicative of the magnitude of electrical voltage provided to the motor 108. The voltage sensor 126 provides the signal to the data processor 128.

The a.c. electrical voltage V provided to the motor 108 is expectedly sinusoidal, and given by:

$$V = V_{MAX} \cdot \sin(2\pi f t)$$

where $V_{MAX}$ is a maximum amplitude of the a.c. voltage, f is the frequency of the a.c. voltage (e.g., 60 Hz), and t=time. In contemplated embodiments, the signal produced by the voltage sensor 126 is indicative of the maximum amplitude of the a.c. voltage $V_{MAX}$ provided to the motor 108.

The data processor 128 may use the signals from the current sensor 124 and the voltage sensor 126 to produce the signal 130 sent to the filter status indicator 122. Alternately, the data processor 128 may use the signals from the current sensor 124 and the voltage sensor 126 to produce an output signal, and the output signal may be used to produce the signal 130.

Figure 2:
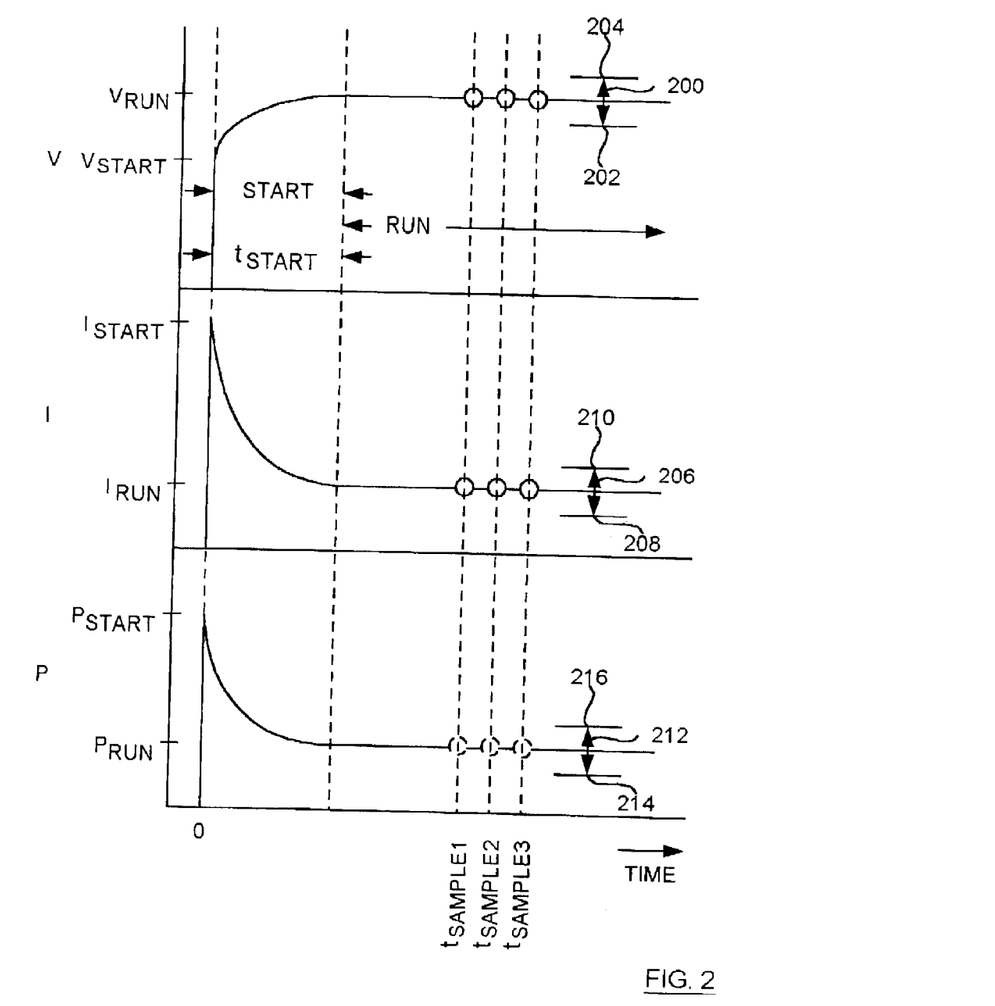
FIG. 2 is a graph of electrical voltage provided to, and electrical current and power required by, the electric motor of FIG. 1 versus time while the motor is operating.

FIG. 2 is a graph of electrical voltage provided to, and electrical current and power required by, the motor 108 of FIG. 1 versus time while the motor 108 is operating. Referring to FIGS. 1 and 2, during a first portion of the time the motor 108 is operating, $t_{START}$, the motor 108 is starting. After the motor 108 starts, the motor 108 is running for the remainder of the time the motor 108 is operating.

Single phase a.c. induction motors are commonly used in fans and pumps. Accordingly, in the embodiment of FIGS. 1 and 2, motor 108 is a single phase a.c. induction motor having a rotor positioned within a surrounding stator. The stator contains a number of conductor windings. When a.c. electrical voltage is applied to the windings, an a.c. electrical current flows through the windings, and a moving magnetic field is created around the stator. The magnetic field created by the stator induces a current in the rotor, and the current in the rotor creates a second magnetic field about the rotor. The interaction of the two magnetic fields produces a torque on the rotor, causing the rotor to rotate with respect to the stator. The frequency of the a.c. electrical power provided to the stator determines a rate at which the magnetic field about the stator changes, and thus a maximum speed at which the rotor rotates within the stator.

When the a.c. electrical power is first applied to the motor 108, the rotor is not yet turning, and the electrical impedance of the motor 108 is relatively low. The initial starting current (the locked rotor current) of an a.c. induction motor is typically about 6 times the run current (the full load amps or FLA). As the rotor of the motor 108 starts to turn, the electrical impedance of the motor 108 increases, and the a.c. current drawn by the motor 108 decreases as indicated in FIG. 2.

Conductors providing a.c. electrical power from the a.c. power source 110 in FIG. 1 to the motor 108, including the conductors 114A and 114B, have a certain amount of electrical resistance. (The conductors also have electrical inductance, but the inductance of the conductors will be ignored.) Current provided to the motor 108 via the conductors causes a voltage drop across the conductors, and the a.c. voltage at the motor 108 is the source a.c. voltage at the a.c. power source 110 minus the voltage drop across the conductors. A typical electrical power distribution system is designed such that the voltage drop between the a.c. power source 110 and the motor 108 is less than 5 percent, and typically 3 percent.

The higher starting current of the motor 108 causes a greater voltage drop in the conductors providing the a.c. power from the a.c. power source 110 in FIG. 1 to the motor 108 in FIG. 1. As a result, the a.c. voltage provided to the motor 108 when the motor 108 is starting is reduced as indicated in FIG. 2. For example, the initial starting voltage provided to the motor 108 may be about 75 percent of the a.c. voltage at the a.c. power source 110 in FIG. 1.

After the motor 108 has started (i.e., when the motor 108 is running), the a.c. voltage provided to, and the a.c. current required by, the motor 108 are fairly constant as indicated in FIG. 2.

In a single phase a.c. system where a.c. voltage and a.c. current are provided to an electrical load, and the a.c. voltage and the a.c. current are not in phase (i.e., the load is reactive), the apparent power delivered to the load is the product of the root mean square (RMS) values of the a.c. voltage ($V_{RMS}$) and the a.c. current ($I_{RMS}$):

$$P_{APPARENT} = V_{RMS} \cdot I_{RMS}$$

where $V_{RMS} = 0.707 \cdot V_{MAX}$ and $I_{RMS} = 0.707 \cdot I_{MAX}$, and $$P_{APPARENT} = 0.5 \cdot V_{max} \cdot I_{max}$$

The average or real power delivered to the load is:

$$P_{AVERAGE} = V_{RMS} \cdot I_{RMS} \cdot \cos\theta = 0.5 \cdot V_{max} \cdot I_{max} \cdot \cos\theta$$

where $\theta$ is the phase angle between the a.c. voltage and the a.c. current. The factor ($\cos\theta$) is called the power factor.

In FIG. 2, and for the purposes described herein, electrical power P required by the motor 108 is generally given by:

$$P = k \cdot V_{max} \cdot I_{max}$$

where k can be any selected number. The factor k may be selected to be, for example, a number greater than 0 and less than or equal to 1. When k=0.5, P is a measure of apparent power.

While the factor k may be fixed for convenience, the factor k need not be constant. For example, when k=0.5·cos θ, and phase angle θ between the a.c. voltage and the a.c. current varies, P is a measure of average power.

As indicated in FIG. 2, the motor 108 requires (i.e., draws) more electrical power when starting than when running. It is noted that the power factor (cos θ) of motor 108 is expectedly less then 1.0 when motor 108 is running (i.e., after the motor 108 has started), and even lower when motor 108 is starting. For example, the initial starting power factor (cos θ) of motor 108 may be about 0.64, and may increase to approximately 0.8 when motor 108 is running.

As indicated in FIG. 2, the a.c. voltage provided to the motor 108 when running varies within an acceptable a.c. voltage range 200. The acceptable a.c. voltage range 200 is defined to be between a minimum acceptable a.c. voltage 202 and a maximum acceptable a.c. voltage 204.

For example, a nominal value of a.c. voltage provided to the motor 108 when running may be a nominal value of the a.c. voltage at the a.c. power source 110 minus the voltage drop across the conductors providing the a.c. electrical power from the a.c. power source 110 to the motor 108 (typically 3 percent). The nominal value of the a.c. voltage at the a.c. power source 110 (e.g., from an electric utility) may vary by, for example, plus or minus 5 percent. Thus the minimum acceptable a.c. voltage 202 may be the nominal value of the a.c. voltage at the a.c. power source 110 minus 8 percent, and the maximum acceptable a.c. voltage 204 may be the nominal value of the a.c. voltage at the a.c. power source 110 plus 2 percent.

Similarly, the a.c. current required by the motor 108 when running varies within an acceptable a.c. current range 206 as indicated in FIG. 2. The acceptable a.c. current range 206 is defined to be between a minimum acceptable a.c. current 208 and a maximum acceptable a.c. current 210.

During normal operation, the a.c. current required by the motor 108 when running is largely dependent on the a.c. voltage provided to the motor 108 and the condition of the filter element 116 of FIG. 1. When the a.c. voltage provided to the motor 108 is fairly constant over time, the a.c. current required by the motor 108 when running is largely dependent on the condition of the filter element 116. In general, as particulates trapped in the filter element 116 impede the flow of fluid through the filter element 116, the mechanical load on the motor 108 is reduced, and the magnitude of a.c. current required by the motor 108 decreases.

Further, the a.c. power required by the motor 108 when running varies within acceptable a.c. power range 212 as indicated in FIG. 2. The acceptable a.c. power range 212 is defined to be between a minimum acceptable a.c. power 214 and a maximum acceptable a.c. power 216.

By definition, the a.c. power required by the motor 108 when running is dependent on the a.c. voltage provided to, and the a.c. current required by, the motor 108 when running.

Like the a.c. current, the a.c. power required by the motor 108 when running during normal operation is largely dependent on the a.c. voltage provided to the motor 108 and the condition of the filter element 116 of FIG. 1. When the a.c. voltage provided to the motor 108 is fairly constant over time, the a.c. power required by the motor 108 when running is largely dependent on the condition of the filter element 116. In general, as particulates trapped in the filter element 116 impede the flow of fluid through the filter element 116 and the mechanical load on the motor 108 is reduced as a result, the magnitude of a.c. power required by the motor 108 decreases.

In the embodiment described below, the acceptable a.c. voltage range 200 and the acceptable a.c. power range 212 are determined during an initialization phase of the filter condition sensing circuit 120 which precedes a normal operation phase of the filter condition sensing circuit 120. That is, the minimum acceptable a.c. voltage 202, the maximum acceptable a.c. voltage 204, the minimum acceptable a.c. power 214, and the maximum acceptable a.c. power 216 are determined during the initialization phase.

Figure 3A:
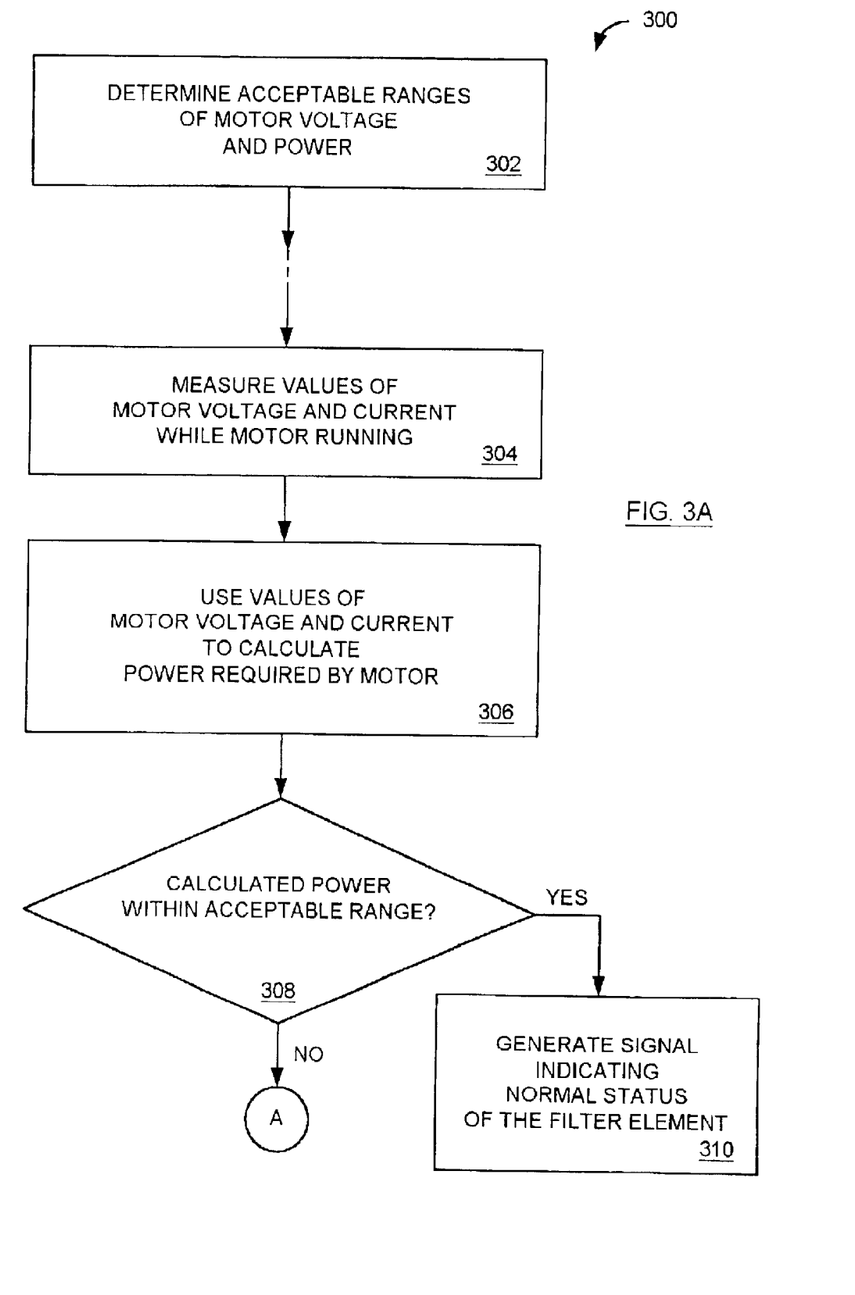
FIGS. 3A–3B in combination form a flow chart of a method for determining a condition of a filter element.
Figure 3B:
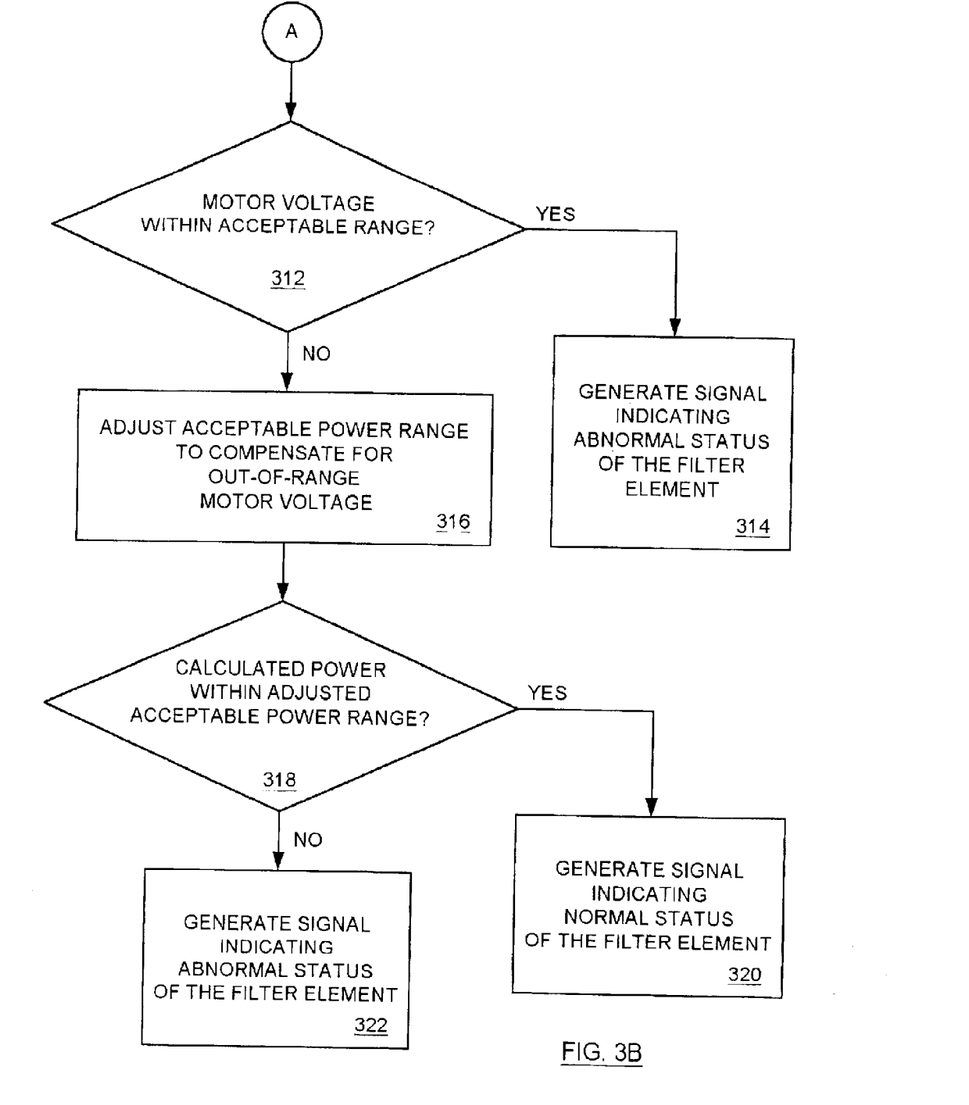
Figure 4A:
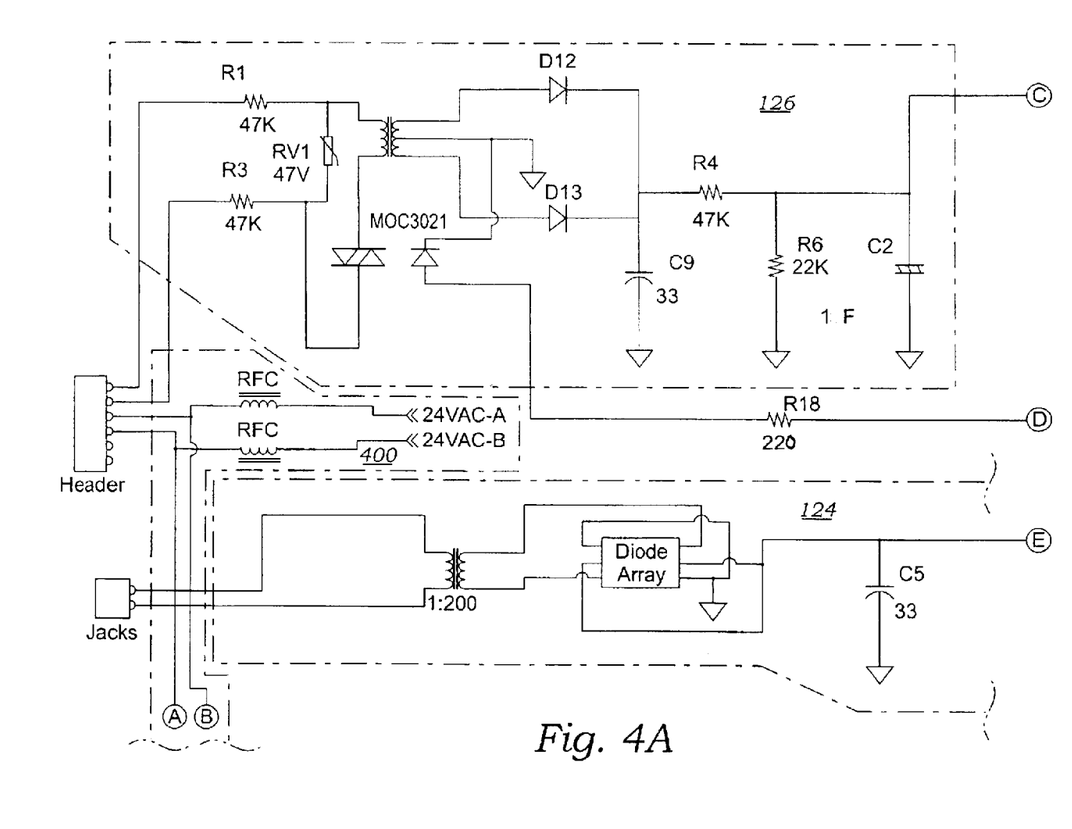
FIGS. 4A–4D in combination form a diagram of one embodiment of the filter condition sensing circuit of FIG. 1.
Figure 4B:
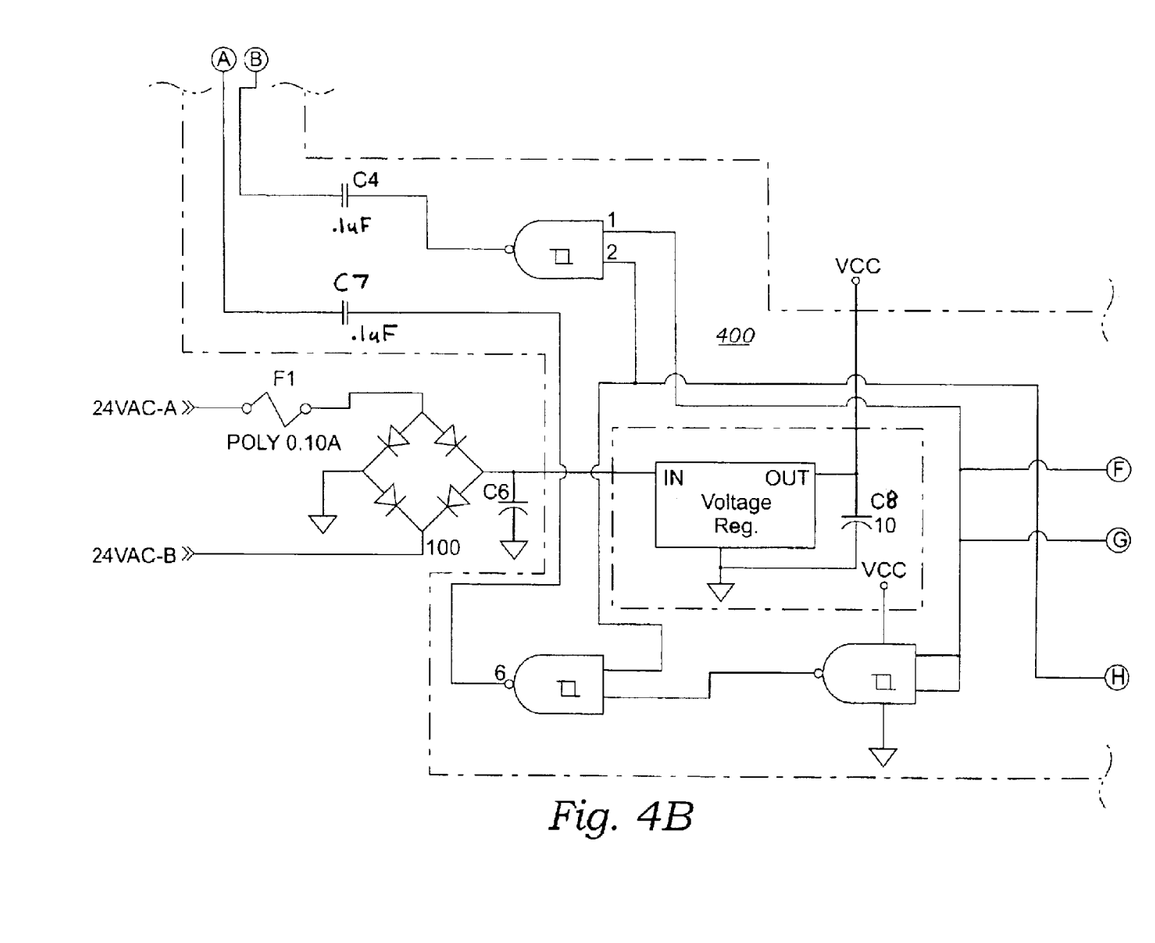
Figure 4C:
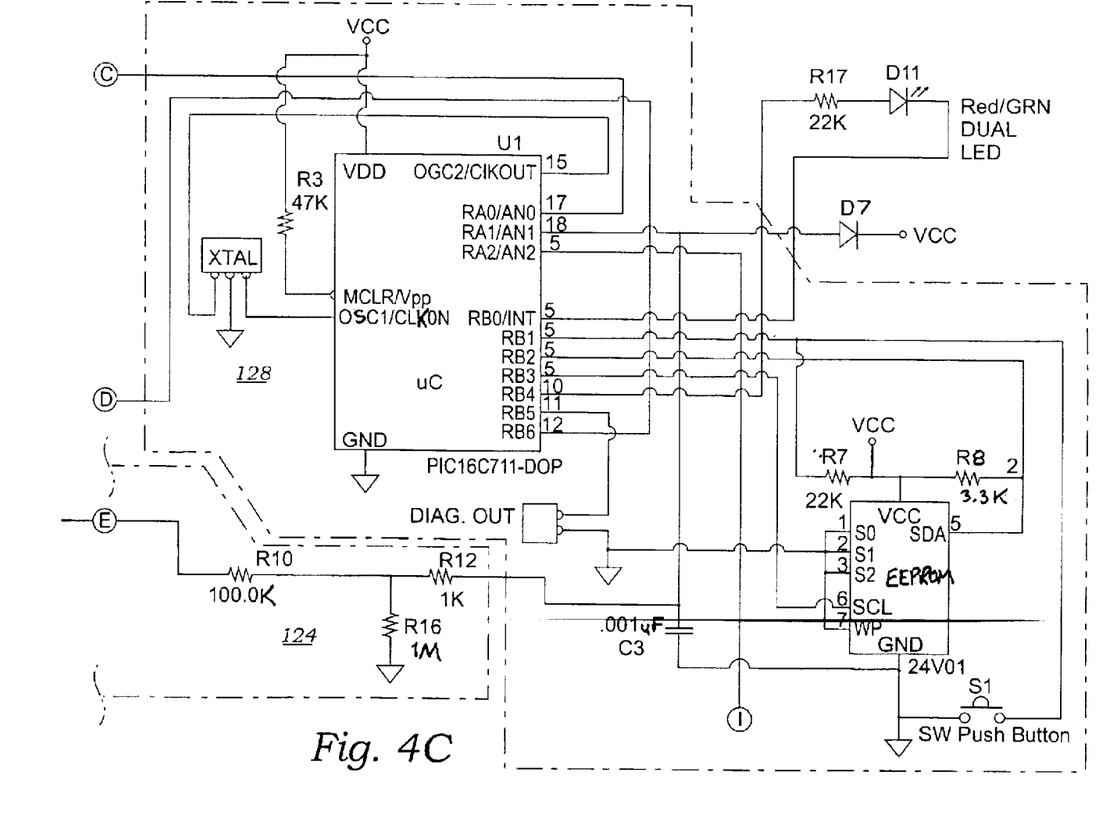
Figure 4D:
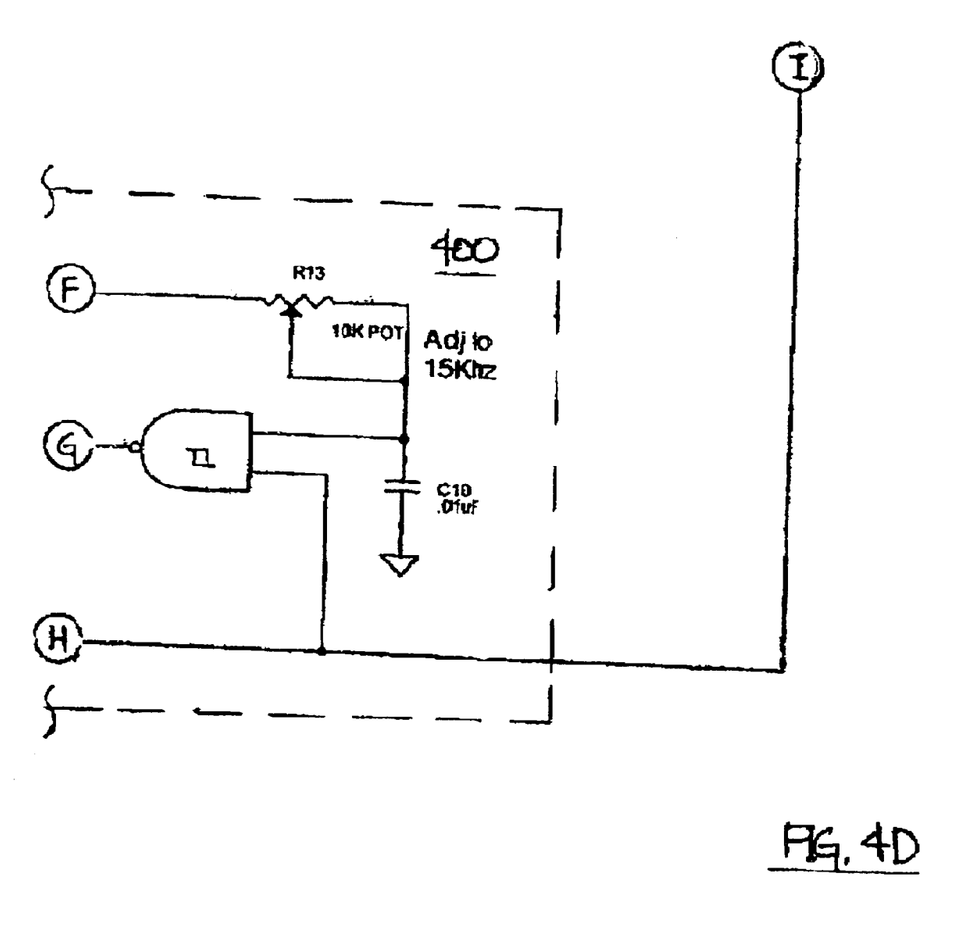

FIGS. 3A–3B in combination form a flow chart of a method 300 for determining a condition of a filter element (e.g., a condition of the filter element 116 of FIG. 1). In one embodiment, the data processor 128 of FIG. 1 carries out the method 300. During a first step 302 of the method 300, acceptable ranges of motor voltage and power (e.g., the acceptable a.c. voltage range 200 and the acceptable a.c. power range 212) are determined. The step 302 is preferably performed during the initialization phase of the filter condition sensing circuit 120 of FIG. 1 which precedes the normal operation phase of the filter condition sensing circuit 120.

As described above, the signal produced by the current sensor 124 and provided to the data processor 128 is indicative of the a.c. current required by the motor 108, and the signal produced by the voltage sensor 126 and provided to the data processor 128 is indicative of the a.c. voltage provided to the motor 108. In some embodiments, the signal produced by the current sensor 124 is indicative of the maximum a.c. current $I_{MAX}$ provided to the motor 108, and the signal produced by the voltage sensor 126 is indicative of the maximum a.c. voltage $V_{MAX}$ provided to the motor 108.

Each time the motor 108 operates, the data processor 128 may sample the signals from the current sensor 124 and the voltage sensor 126 at different times while the motor 108 is running, and average the samples to reduce measurement errors. For example, in one embodiment depicted in FIG. 2, the data processor 128 samples the signals from the current sensor 124 and the voltage sensor 126 at times $t_{SAMPLE1}$, $t_{SAMPLE2}$, and $t_{SAMPLE3}$, where $t_{SAMPLE1} > t_{START}$, $t_{SAMPLE2} > t_{SAMPLE1}$, and $t_{SAMPLE3} > t_{SAMPLE2}$. Time $t_{SAMPLE1}$ is preferably long enough after $t_{START}$ to allow the motor 108 voltage and current to stabilize as indicated in FIG. 2. Time $t_{SAMPLE1}$ may be, for example, a few seconds after $t_{START}$. The 3 motor voltage samples may be averaged to form an a.c. voltage value, and the 3 motor current samples may be averaged to form an a.c. current value.

The following pseudocode will be use to describe one method of determining the minimum acceptable a.c. voltage 202 and the maximum acceptable a.c. voltage 204 defining the acceptable a.c. voltage range 200, and the minimum acceptable a.c. power 214 and the maximum acceptable a.c. power 216 defining the acceptable a.c. power range 212.

```
/* initialization */
min_acceptable_voltage = 100000;
max_acceptable_voltage = 0;
min_acceptable_power = 100000;
max_acceptable_power = 0;
while(motor_operating) {
/* wait until after motor starts */
wait(tsample1); /* tsample1 > tstart */
/* get 3 samples of voltage and current */
voltage_sample1 = sample(signal_from_voltage_sensor);
current_sample1 = sample(signal_from_current_sensor);
voltage_sample2 = sample(signal_from_voltage_sensor);
current_sample2 = sample(signal_from_current_sensor);
voltage_sample3 = sample(signal_from_voltage_sensor);
current_sample3 = sample(signal_from_current_sensor);
/* average values to reduce measurement errors */
voltage_value = (voltage_sample1 + voltage_sample2 + voltage_sample3)/3;
current_value = (current_sample1 + current_sample2 + current_sample3)/3;
/* update min_acceptable_voltage and max_acceptable_voltage */
if(voltage_value < min_acceptable_voltage)
    min_acceptable_voltage = voltage_value;
if(voltage_value> max_acceptable_voltage)
    max_acceptable_voltage = voltage_value;
/* calculate power delivered to motor while running */
power = k * voltage_value * current_value);
/* update min_acceptable_power and max_acceptable_power */
if(power < min_acceptable_power)
    min_acceptable_voltage = power;
if(power > max_acceptable_power)
    max_acceptable_voltage = power;
}
```

The initialization phase or "learn period" of the filter condition sensing circuit 120 of FIG. 1, during which the acceptable ranges of motor voltage and power are determined, is preferably carried out over several hours of operation of the motor 108. for example, the learn period may occur over a period of time during which the motor 108 operates for between 6 and 10 hours.

The learn period preferably occurs after a new filter element 116 is installed and a control system of the fluid delivery system 100 of FIG. 1 is reset. In one embodiment, the filter status indicator 122 of FIG. 1 includes a red lamp or light-emitting diode and a green lamp or light-emitting diode, and during the learn period the red and green lamps or light-emitting diodes are illuminated alternately.

Values of motor voltage and current are obtained while the motor is running during a step 304. This may be carried out by sampling the signals from the current sensor 124 and the voltage sensor 126 at 3 different times while the motor 108 is running as shown in FIG. 2 and described above, and averaging the samples to reduce measurement errors.

During a step 306, the values of the motor voltage and current obtained during the step 304 are used to calculate the power required by the motor. The power calculation may be carried out as described above.

During a decision step 308, a determination is made as to whether the calculated power required by the motor is within the acceptable power range (e.g., the acceptable a.c. power range 212 of FIG. 2). That is, a determination is made as to whether the calculated power required by the motor is greater than or equal to a minimum acceptable power value (e.g., the minimum acceptable a.c. power 214 of FIG. 2), and less than or equal to a maximum acceptable power value (e.g., the maximum acceptable a.c. power 216 of FIG. 2).

If the calculated power required by the motor is determined to be within the acceptable power range during the decision step 308, a signal is generated during a step 310 indicating a normal (i.e., not overly restrictive) status of the filter element. The signal may be, for example, provided to a filter status indicator (e.g., the filter status indicator 122 of FIG. 1). In response to the signal, the filter status indicator may display a normal status of the filter element (e.g., illuminate a green lamp or light-emitting diode).

On the other hand, if the calculated power required by the motor is not within the acceptable power range during the decision step 308, a decision step 312 is performed next. During the decision step 312, a determination is made as to whether the motor voltage is within the acceptable voltage range (e.g., the acceptable a.c. voltage range 200 of FIG. 2). That is, a determination is made as to whether the motor voltage is greater than or equal to a minimum acceptable voltage value (e.g., the minimum acceptable a.c. voltage 202 of FIG. 2), and less than or equal to a maximum acceptable voltage value (e.g., the maximum acceptable a.c. voltage 204 of FIG. 2).

If the motor voltage is determined to be within the acceptable voltage range during the decision step 312, a signal is generated during a step 314 indicating an abnormal (i.e., overly restrictive) status of the filter element. The signal may be, for example, provided to the filter status indicator (e.g., the filter status indicator 122 of FIG. 1). In response to the signal, the filter status indicator may display an abnormal status of the filter element (e.g., illuminate a red lamp or light-emitting diode).

On the other hand, if the voltage provided to the motor is not within the acceptable voltage range during the decision step 312, a step 316 is performed next. During the step 316, the acceptable power range is adjusted to compensate for the out-of-range motor voltage.

For example, of the motor voltage is less than the minimum acceptable voltage value (e.g., the minimum acceptable a.c. voltage 202 of FIG. 2), the minimum acceptable power value (e.g., the minimum acceptable a.c. power 214 of FIG. 2) may be adjusted to compensate for the out-of-range motor voltage. In one embodiment, the minimum acceptable power value is adjusted by multiplying the minimum acceptable power value by a ratio of the motor voltage to the minimum acceptable voltage value:

minimum_acceptable_power=minumum_acceptable_power*(voltage_value/minimum_acceptable_voltage)

Similarly, when the motor voltage is greater than the maximum acceptable voltage value (e.g., the maximum acceptable a.c. voltage 204 of FIG. 2), the maximum acceptable power value may be adjusted by multiplying the maximum acceptable power value by a ratio of the motor voltage to the maximum acceptable voltage value:

maximum_acceptable_power=maximum_acceptable_power*(voltage_value/maximum_acceptable_voltage)

During a decision step 318, a determination is made as to whether the calculated power required by the motor is within the adjusted acceptable power range. That is, a determination is made as to where the calculated power required by the motor is greater than or equal to the minimum acceptable power value, and less than or equal to the maximum acceptable power value.

If the calculated power required by the motor is determined to be within the adjusted acceptable power range during the decision step 318, the signal indicating the normal (i.e., not overly restrictive) status of the filter element is generated during a step 320. The signal may be, for example, provided to the filter status indicator (e.g., the filter status indicator 122 of FIG. 1). In response to the signal, the filter status indicator may display the normal status of the filter element (e.g., illuminate the green lamp or light-emitting diode).

On the other hand, if the motor voltage is determined to be outside of the adjusted acceptable voltage range during the decision step 318, the signal indicating the abnormal (i.e., overly restrictive) status of the filter element is generated during a step 322. The signal may be, for example, provided to the filter status indicator (e.g., the filter status indicator 122 of FIG. 1). In response to the signal, the filter status indicator may display the abnormal status of the filter element (e.g., illuminate the red lamp or light-emitting diode).The data processor 128 of FIG. 1 may also store a pre-programmed current threshold value. Following the initialization phase or learn period, the value of motor current obtained while the motor is running (e.g., during the step 304 above) may be compared to the pre-programmed current threshold value. In one embodiment, the filter status indicator 122 of FIG. 1 includes the red lamp or light-emitting diode and the green lamp or light-emitting diode as described above. If the motor current value is greater than the pre-programmed current threshold value, the signal 130 from the data processor 128 may cause the filter status indicator 122 to flash the red lamp or light-emitting diode on and off.

FIGS. 4A–4D in combination are a diagram of one embodiment of the filter condition sensing circuit 120 of FIG. 1. In the embodiment of FIGS. 4A–4D, the current sensor 124 includes a transformer, a diode array, and a filter network. The current sensor 124 produces a voltage signal indicative of a maximum amplitude of a.c. current required by the motor 108, and provides the voltage signal to the data processor 128.

In the embodiment of FIGS. 4A–4D, the voltage sensor 126 includes a transformer, an optoisolator with triac driver output, a diode array, and a filter network. The voltage sensor 126 produces a voltage signal indicative of a maximum amplitude of a.c. voltage provided to the motor 108, and provides the voltage signal to the data processor 128.

In the embodiment of FIGS. 4A–4D, the data processor 128 includes a microcontroller coupled to an electrically erasable programmable read only memory (EEPROM). The EEPROM is used to store instructions, and the microcontroller fetches the instructions from the EEPROM and executes the instructions. The instructions stored in the EEPROM may embody the above described method 300 of FIGS. 3A–3B for indicating a condition of the filter element 116 of FIG. 1. In this case, the minimum acceptable a.c. voltage 202 and the maximum acceptable a.c. voltage 204 defining the acceptable a.c. voltage range 200, and the minimum acceptable a.c. power 214 and the maximum acceptable a.c. current 216 defining the acceptable a.c. power range 212, may also be stored in the EEPROM. In the embodiment of FIGS. 4A–4D, the microcontroller includes an analog-to-digital converter for converting the analog voltage signals from the current sensor 124 and the voltage sensor 126 to digital values. The EEPROM may also be used to store the pre-programmed current threshold value described above.

In the embodiment of FIGS. 4A–4D, the filter condition sensing circuit 120 also includes an output section 400 for sending the signal 130 of FIG. 1 to the filter status indicator 122 of FIG. 1. The output section 400 includes a gated 15 kHz oscillator enabled by the microcontroller of the data processor 128 when the filter status indicator 122 is to display an abnormal status of the filter element 116 of FIG. 1. When the 15 kHz oscillator is enabled, the output section 400 drives the 15 kHz output signal produced by the 15 kHz oscillator on a pair of conductors providing 24 volts a.c. (VAC) to the filter condition sensing circuit 120.

The filter status indicator 122 may also be connected to the pair of conductors, and may receive the 15 kHz signal from the filter condition sensing circuit 120 via the conductors. In the absence of the 15 kHz signal from the filter condition sensing circuit 120, the filter status indicator 122 may display a normal status of the filter element 144 (e.g., illuminate the green lamp or light-emitting diode). When the filter status indicator 122 receives the 15 kHz signal from the filter condition sensing circuit 120, the filter status indicator 122 may cease to display the normal status of the filter element 144 (e.g., cease to illuminate the green lamp or light-emitting diode) and display an abnormal status of the filter element 144 (e.g., illuminate the red lamp or light-emitting diode).

While the invention has been described with reference to at least one preferred embodiment, it is to be clearly understood by those skilled in the art that the invention is not limited thereto. Rather, the scope of the invention is to be interpreted only in conjunction with the appended claims.

All patents, patent applications, and other documents and printed matter cited or referred to in this application are hereby incorporated by reference in full.

What is claimed is:

1. A filter condition sensing circuit, comprising:
a current sensor coupled to a conductor providing electrical current to a motor used to move a fluid through a filter element and configured to produce a signal indicative of a magnitude of the electrical current;
a voltage sensor coupled to a pair of conductors providing electrical voltage to the motor and configured to produce a signal indicative of a magnitude of the electrical voltage; and
a data processor coupled to receive the signals produced by the current sensor and the voltage sensor and configured to use the signals to determine an acceptable range of electrical power required by the electric motor during a first time period, to determine a magnitude of electrical power required by the electric motor during a second time period subsequent to the first time period, and to generate a first output signal indicative of a normal condition of the filter element during the second time period in the event the magnitude of electrical power required by the electric motor is within the acceptable range of electrical power.

2. The filter condition sensing circuit as recited in claim 1, wherein the fluid is a gas or a liquid.

3. The filter condition sensing circuit as recited in claim 1, wherein the fluid is air.

4. The filter condition sensing circuit as recited in claim 1, wherein the acceptable range of electrical power is defined by a minimum value of acceptable electrical power and a maximum value of acceptable electrical power.

5. The filter condition sensing circuit as recited in claim 4, wherein during the first time period the data processor is configured to use the signals produced by the current sensor and the voltage sensor to calculate a magnitude of electrical power required by the electric motor, and to update the minimum value of acceptable electrical power and the maximum value of acceptable electrical power dependent upon the calculated magnitude of electrical power required by the electric motor.

6. The filter condition sensing circuit as recited in claim 5, wherein during the second time period the data processor is configured to generate the first output signal in the event the magnitude of electrical power required by the electric motor is: (i) greater than or equal to the minimum value of acceptable electrical power, and (ii) less than or equal to the maximum value of acceptable electrical power.

7. The filter condition sensing circuit as recited in claim 6, wherein the data processor is configured to generate the second output signal in the event the magnitude of electrical power required by the electric motor during the second time period is not within the adjusted acceptable range of electrical power.

8. The filter condition sensing circuit as recited in claim 1, wherein the data processor is configured to determine an acceptable range of electrical voltage provided to the electric motor during the first time period, and to generate a second output signal indicative of an abnormal condition of the filter element during the second time period in the event: (i) the magnitude of electrical power required by the electric motor during the second time period is within the acceptable range of electrical power, and (ii) the magnitude of electrical voltage provided to the electric motor during the second time period is within the acceptable range of electrical power.

9. The filter condition sensing circuit as recited in claim 8, wherein in the event the magnitude of electrical power required by the electric motor during the second time period is not within the acceptable range of electrical power and the magnitude of electrical voltage provided to the electric motor during the second time period is not within the acceptable range of electrical power, the data processor is configured to adjust the acceptable range of electrical power to compensate for the magnitude of electrical voltage provided to the electric motor not being within the acceptable range of electrical power.

10. The filter condition sensing circuit as recited in claim 9, wherein the data processor is configured to generate the first output signal in the event the magnitude of electrical power required by the electric motor during the second time period is within the adjusted acceptable range of electrical power.

11. The filter condition sensing circuit as recited in claim 1, wherein during the second time period the data processor is configured to use the signal produced by the current sensor to calculate a magnitude of electrical current required by the electric motor, and to generate a third output signal in the event the magnitude of electrical current required by the electric motor is greater than a pre-programmed threshold value.

12. A filter condition indicating system, comprising:
a filter condition sensing circuit, comprising:
a current sensor coupled to a conductor providing electrical current to a motor used to move a fluid through a filter element and configured to produce a signal indicative of a magnitude of the electrical current;
a voltage sensor coupled to a pair of conductors providing electrical voltage to the motor and configured to produce a signal indicative of a magnitude of the electrical voltage;
a data processor coupled to receive the signals produced by the current sensor and the voltage sensor and configured to use the signals to determine an acceptable range of electrical power required by the electric motor during a first time period, to determine a magnitude of electrical power required by the electric motor during a second time period subsequent to the first time period, and to generate a first output signal indicative of a normal condition of the filter element during the second time period in the event the magnitude of electrical power required by the electric motor is within the acceptable range of electrical power; and
a filter status indicator coupled to receive the first output signal and configured to indicate the normal condition of the filter element to a user in response to the first output signal.

13. The filter condition indicating system as recited in claim 12, wherein the filter status indicator comprises a light emitting device activated in response to the first output signal.

14. A method for determining a condition of a filter element, comprising:
during a first time period, determining an acceptable range of electrical power required by an electric motor used to move a fluid through the filter element;
determining a magnitude of electrical power required by the electric motor during a second time period subsequent to the first time period; and
generating a first signal indicative of a normal condition of the filter element in the event the magnitude of electrical power required by the electric motor during the second time period is within the acceptable range of electrical power.

15. The method as recited in claim 14 wherein the fluid is a gas or a liquid.

16. The method as recited in claim 14, wherein the determining the acceptable range of electrical power comprises:
performing the following in the event the motor is running:
measuring a magnitude of electrical voltage provided to the electric motor;
measuring a magnitude of electrical current required by the electric motor; and
using the magnitude of electrical voltage provided to the electric motor and the magnitude of electrical current required by the electric motor to calculate a magnitude of electrical power required by the electric motor;
using the calculated magnitude of electrical power required by the electric motor to update a minimum value of acceptable electrical power and a maximum value of acceptable electrical power.

17. The method as recited in claim 16, wherein the generating comprises:
generating a first signal indicative of a normal condition of the filter element in the event the magnitude of electrical power required by the electric motor during the second time period is: (i) greater than or equal to the minimum value of acceptable electrical power, and (ii) less than or equal to the maximum value of acceptable electrical power.

18. The method as recited in claim 14, wherein the determining the magnitude of electrical power comprises:
performing the following in the event the motor is running:
measuring a magnitude of electrical voltage provided to the electric motor;
measuring a magnitude of electrical current required by the electric motor;
using the magnitude of electrical voltage provided to the electric motor and the magnitude of electrical current required by the electric motor to calculate the magnitude of electrical power required by the electric motor.

19. The method as recited in claim 14, further comprising:
during the first time period, determining an acceptable range of electrical voltage provided to the electric motor; and
generating a second signal indicative of an abnormal condition of the filter element in the event: (i) the magnitude of electrical power required by the electric motor during the second time period is within the acceptable range of electrical power, and (ii) the magnitude of electrical voltage provided to the electric motor during the second time period is within the acceptable range of electrical power.

20. The method as recited in claim 19, further comprising:
performing the following in the event: (i) the magnitude of electrical power required by the electric motor during the second time period is within the acceptable range of electrical power, and (ii) the magnitude of electrical voltage provided to the electric motor during the second time period is not within the acceptable range of electrical power:
adjusting the acceptable range of electrical power to compensate for the magnitude of electrical voltage provided to the electric motor not being within the acceptable range of electrical power;
generating the first signal in the event the magnitude of electrical power required by the electric motor during the second time period is within the adjusted acceptable range of electrical power; and
generating the second signal in the event the magnitude of electrical power required by the electric motor during the second time period is not within the adjusted acceptable range of electrical power.

* * * * *